UNITED STATES PATENT OFFICE.

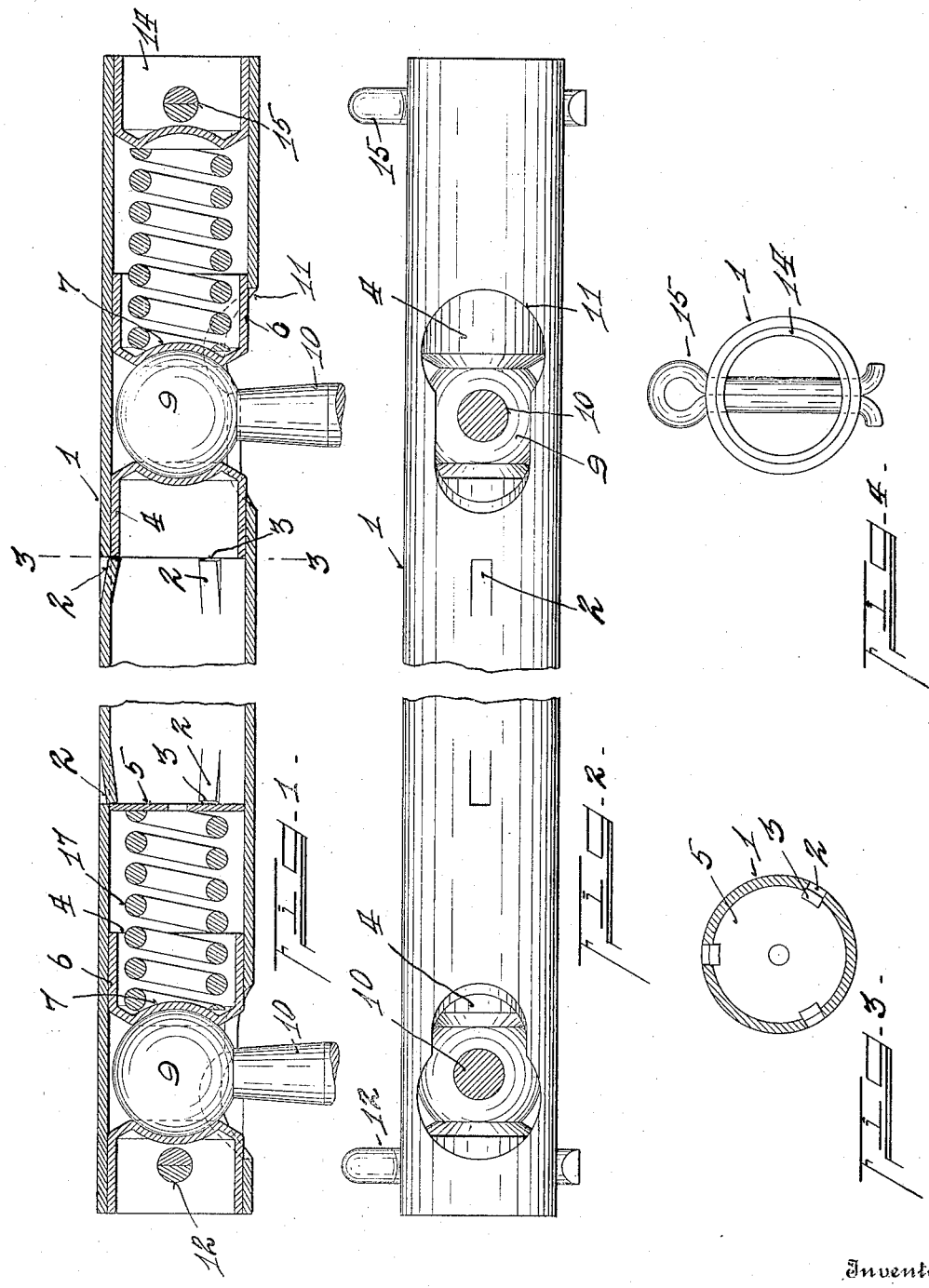

RICHARD A. KAPS, OF CINCINNATI, OHIO, ASSIGNOR TO THE CINCINNATI BALL CRANK COMPANY, OF CINCINNATI, OHIO, A CORPORATION OF OHIO.

STEERING REACH-ROD.

1,401,110. Specification of Letters Patent. Patented Dec. 20, 1921.

Application filed July 5, 1919. Serial No. 308,847.

*To all whom it may concern:*

Be it known that I, RICHARD A. KAPS, a citizen of the United States, and residing at Cincinnati, in the county of Hamilton and State of Ohio, have invented a new and useful Improvement in Steering Reach-Rods, of which the following specification is a full disclosure.

My invention relates to an improvement in drag link device or steering reach rod, and more particularly to the socket or ball seat members of a ball and socket joint, and has among its objects to provide a form of socket member which shall be simple and economical to manufacture and which will be strong and durable with a smooth concaved ball seat or bearing surface. The device, as a part of an automobile steering reach rod, is adaptable either as a socket or seat member for a ball and socket joint, or as a plug for closing the end of the rods, reducing the number of different parts required for the steering rod unit. This is of considerable advantage in assembling the parts of a steering rod and in making repairs, and reduces the variety of parts for a dealer to carry in stock.

With these and incidental objects in view, all more fully revealed in the following description of the accompanying drawings, forming a part of this specification, like characters of reference in the drawings denote corresponding parts throughout the several views, of which:

Figure 1 is a central section through the opposite end portions of the steering reach rod containing my improvements.

Fig. 2 is a side elevation thereof.

Fig. 3 is a section on line 3—3, Fig. 1.

Fig. 4 is an end elevation of the rod.

The link or rod illustrated herein conforms to the tubular rod shown in Letters Patent No. 1,199,048, to Alfred B. Breeze, dated September 26, 1916, for drag link device, in which the means for supporting the socket bearing pieces of the ball and socket joint in the ends of the rod or tube comprise a series of tangs or tongues 2, the front ends of which are bent inwardly into the tube 1, so that the ends of the tangs provide abutments or shoulders 3, against which one of the socket parts engages.

In the joint shown to the right of Fig. 1, a socket member 4 is engaged against the ends of the tangs 3, while in the joint shown at the left side of said figure a washer or disk 5 engages against the tangs.

The arrangement of joint may follow any of the commercial forms, with or without springs, and when springs are employed they may be used against one or both of the opposite socket pieces to yieldingly press the socket pieces against the ball therebetween, although their use is optional in so far as this invention is concerned, which relates principally to a sheet metal stamping of shell form, having a cylindrical body portion and a concavo-convex head closing one end of the body to interchange same as a socket member for a ball and socket joint, and as plugs for closing the ends of a tubular reach rod.

Each socket or plug member comprises a sheet metal stamping formed into tubular or shell form having a cylindrical body portion 6, and a concaved or concavo-convex head portion 7, forming the socket or seat for the ball 9 of the crank arm 10 engaged into the socket end of the tube or rod through a key hole opening 11 in the tube. A pair of these shell-formed socket pieces are disposed within the tube at opposite sides of the ball, and either one or both may be longitudinally slidable within the tube or engaged against an abutment, or they may serve as plugs, as shown at the right of Fig. 1 or as plug and socket pieces, as shown at the left of Fig. 1. In the latter instance, the combined seat and plug is perforated to provide for the insertion of a cotter pin 12, extending through the tube and seat to confine the same within the tube against longitudinal displacement. The socket piece being hollow and open at one end provides a pocket for the spring 17, yieldingly holding the socket shell against the ball. The opposite end of the spring may be engaged against a suitable abutment. In one joint arrangement the spring is shown engaged against the disk 5, while in a second instance against the shell plug 14, confined against longitudinal displacement within the tube by a cotter pin 15.

To standardize the manufacture, it is contemplated to perforate the body portions of all the shells to provide them with alined openings to receive a cotter pin therethrough.

A shell socket member made as a sheet steel stamping provides a very smooth seat surface which requires no polishing, and is a finished product as it comes from the press, the sheet metal incidentally having a hardened film surface further enhanced after being subjected to the pressure of the forming dies.

Having described my invention, I claim;

1. The combination with a tubular member having an opening in one side for the reception of a ball end member, socket pieces engaged within said tubular member providing opposing seats for the ball end member, each socket piece comprising a sheet metal stamping of cup formation consisting of a cylindrical body portion, and a concavo-convex head closing one end of said body portion, the structure providing from one end side a spring receiving pocket with an annularly recessed base, and from the opposite side a concavo ball seat centrally with an annular conical rim.

2. The combination with a tubular member having an opening in one side for the reception of a ball end member, socket pieces engaged within said tubular member respective of providing opposing ball supporting seats and a closure plug, each comprising a sheet metal stamping of cup formation consisting of a cylindrical body portion, and a concavo-convex head closing one end of said body portion, the structure providing from one end side a spring receiving pocket with an annularly recessed base, and from the opposite side a concavo ball seat centrally with an annular conical rim.

In witness whereof, I hereunto subscribe my name, as attested by the two subscribing witnesses.

RICHARD A. KAPS.

Witnesses:
L. A. BECK,
M. F. MORAN.